United States Patent
Garrett et al.

(10) Patent No.: US 9,660,670 B1
(45) Date of Patent: May 23, 2017

(54) SYSTEM, DEVICE, AND METHOD FOR COMBINING SOFTWARE DEFINED RADIOS

(71) Applicant: AVAGO TECHNOLOGIES GENERAL IP (SINGAPORE) PTE. LTD., Singapore (SG)

(72) Inventors: David C. Garrett, Tustin, CA (US); Franciscus Van Der Goes, Zeist (NL); Hooman Darabi, Laguna Niguel, CA (US); Ramon A. Gomez, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/043,040

(22) Filed: Feb. 12, 2016

Related U.S. Application Data

(60) Provisional application No. 62/279,432, filed on Jan. 15, 2016.

(51) Int. Cl.
*H04M 3/00* (2006.01)
*H04B 1/00* (2006.01)
*H04W 8/22* (2009.01)
*H04W 24/02* (2009.01)

(52) U.S. Cl.
CPC ............ *H04B 1/0003* (2013.01); *H04W 8/22* (2013.01); *H04W 24/02* (2013.01)

(58) Field of Classification Search
CPC ....... H04W 24/00; H04W 48/16; H04W 4/02; H04W 8/183; H04W 74/0833; H04W 74/02; H04W 72/1278; H04W 74/08; H04W 8/22; H04W 24/02; H04W 16/14; H04Q 7/24; H04B 1/001; H04B 1/0035; H04B 7/086; H04B 1/0003; H04L 5/16; H04L 27/0006; H04L 5/14
USPC .................... 455/418, 73; 715/843
See application file for complete search history.

(56) References Cited

U.S. PATENT DOCUMENTS

| | | | | |
|---|---|---|---|---|
| 8,804,856 B2* | 8/2014 | Verhelst | ................. | H04B 17/16 375/259 |
| 2005/0151697 A1* | 7/2005 | Cohen | ..................... | H01Q 1/22 343/793 |
| 2006/0007901 A1* | 1/2006 | Roskowski | ........... | H04W 24/00 370/338 |
| 2006/0063483 A1* | 3/2006 | Suematsu | .............. | H04H 40/18 455/3.02 |
| 2007/0054682 A1* | 3/2007 | Fanning | .............. | H04L 27/2608 455/509 |
| 2008/0146178 A1* | 6/2008 | Lu | ......................... | H04B 1/0014 455/187.1 |
| 2009/0047916 A1* | 2/2009 | Haykin | ................. | H04L 5/0037 455/115.1 |
| 2009/0180359 A1* | 7/2009 | Walter | .................. | H04W 48/16 369/6 |
| 2011/0065408 A1* | 3/2011 | Kenington | ........... | H04B 1/1036 455/303 |

(Continued)

*Primary Examiner* — Mahendra Patel
(74) *Attorney, Agent, or Firm* — Oblon, McClelland, Maier & Neustadt, L.L.P.

(57) ABSTRACT

A device includes circuitry configured to assess a broadband spectrum environment including signal and blocker characteristics via one or more receiver paths, determine operational parameters for the device based on the signal and blocker characteristics, and align one or more radio components from one or more radios for operation based on the operational parameters of the device.

20 Claims, 11 Drawing Sheets

(56) References Cited

U.S. PATENT DOCUMENTS

2014/0177484 A1* 6/2014 Balijapalli ............ H04W 16/14
370/280
2014/0241302 A1* 8/2014 Korhonen ............. H04W 74/02
370/329

* cited by examiner

_US 9,660,670 B1_

SYSTEM, DEVICE, AND METHOD FOR COMBINING SOFTWARE DEFINED RADIOS

CROSS-REFERENCE TO RELATED PATENT APPLICATIONS

The present application claims the benefit of the earlier filing date of U.S. provisional application 62/279,432 having common inventorship with the present application and filed in the U.S. Patent and Trademark Office on Jan. 15, 2016, the entire contents of which being incorporated herein by reference.

BACKGROUND

Technical Field

The present disclosure relates to software defined radio (SDR), specifically a device, system, and method for combining SDRs and/or components of SDRs.

Description of the Related Art

Software defined radio (SDR) provides the opportunity to develop fully programmable wireless communication systems, effectively supplanting conventional radio technologies, which typically have the lowest communication layers implemented in primarily in fixed, custom hardware circuits. Due to the fixed characteristics of the hardware component, conventional radios are unable to respond to constantly changing spectrum environments.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
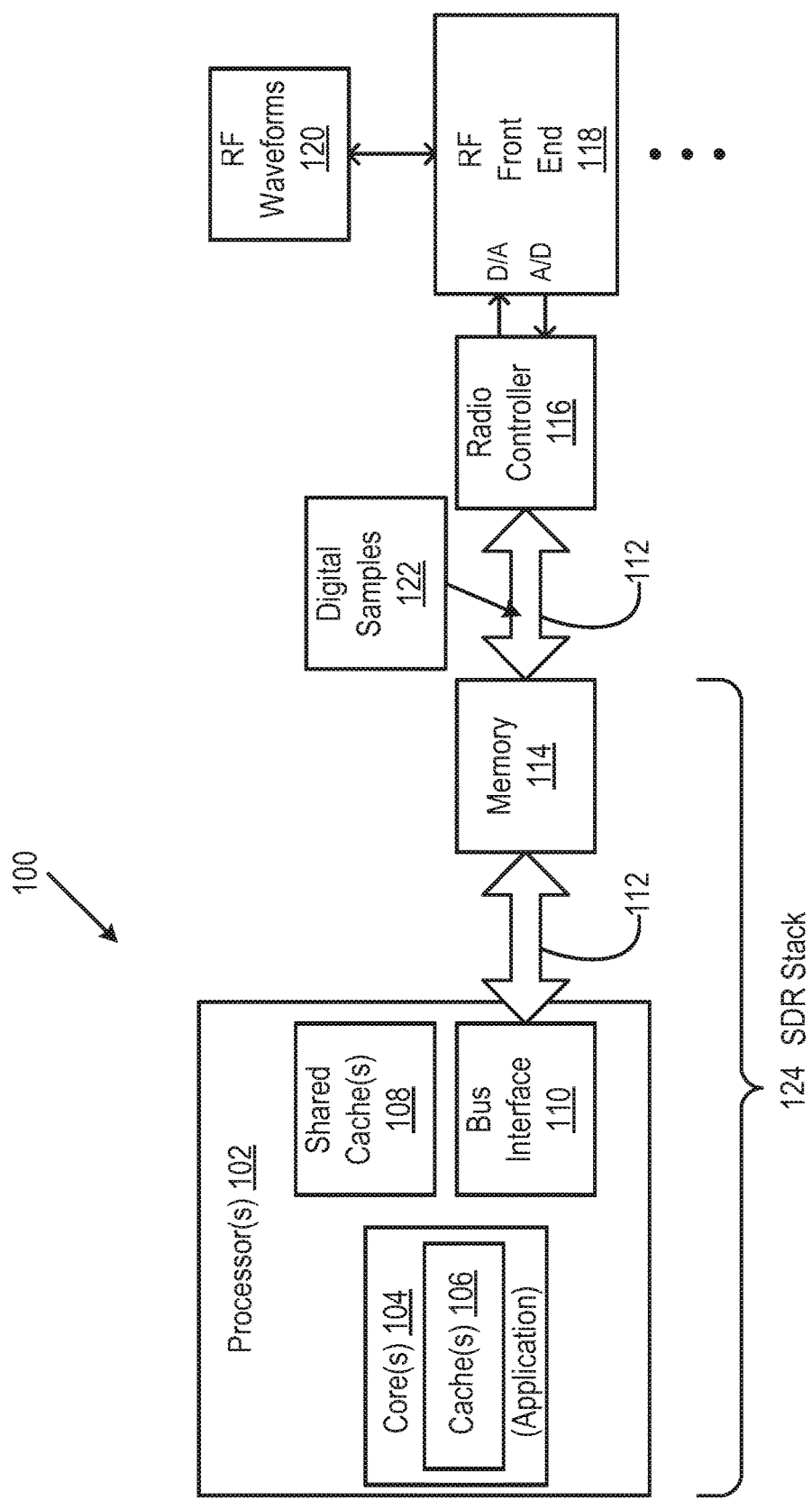
FIG. 1 is an exemplary illustration of a software defined radio (SDR) architecture, according to certain embodiments.

In the drawings, like reference numerals designate identical or corresponding parts throughout the several views.

Further, as used herein, the words "a," "an" and the like generally carry a meaning of "one or more," unless stated otherwise.

In an exemplary implementation, a device includes circuitry configured to assess a broadband spectrum environment including signal and blocker characteristics via one or more receiver paths, determine operational parameters for the device based on the signal and blocker characteristics, and align one or more radio components from one or more radios for operation based on the operational parameters of the device.

In another exemplary implementation, a method includes assessing a broadband spectrum environment including signal and blacker characteristics via one or more receiver paths; determining operational parameters for the device based on the signal and blocker characteristics; and aligning one or more radio components from one or more radios for operation based on the operational parameters of the device.

In another exemplary implementation, a device includes circuitry configured to obtain visibility of a broadband signal spectrum via one or more receivers, determine characteristics of one or more undesired signal components of the broadband signal spectrum received by the one or more receivers, and adaptively modify a configuration of one or more front-end components of the SDR to isolate a desired signal from the undesired signal components.

Aspects of the present disclosure are directed to combining resources of software defined radios (SDRs) to improve overall radio performance. SDR provides a capability to instantaneously assess a broadband spectrum environment and adaptively modify a configuration of the SDR based on the assessed environment while conventional techniques that do not use SDR may use a narrowband scanner to assess the broadband spectrum environment. For example, the SDR can include multiple receivers having varied dynamic ranges and can select which receiver to align for operation based on the assessed spectrum environment. In addition, multi-input, multi-output (MIMO) transceivers can include multiple antenna paths that can be allocated to detecting interference signals that are subtracted from remaining antenna paths. In some implementations, the transceiver of the SDR can include an auxiliary receiver path that is configured to detect distortion in a received signal and cancel the distortion from a primary receiver path.

Implementations disclosed herein present a fully programmable software defined radio (SDR) platform and system able to be implemented on general-purpose computing devices, including personal computer (PC) architectures. Implementations of the SDR herein combine the performance and fidelity of general-purpose processor (GPP) SDR platforms. In addition, implementations of the SDR herein nay use both hardware and software components and techniques to perform the processes described herein.

FIG. 1 illustrates an exemplary architecture of an SDR platform and system 100 according to some implementations herein. The SDR platform and system 100 includes one or more processors 102 that may be multi-core processors according to some implementations. Each core 104 includes one or more corresponding onboard local caches 106 that are used by the corresponding 104 during processing. Additionally, the processor 102 may also include one or more shared caches 108 and a bus interface 110. Examples of suitable multi-core processors include the Xenon™ processor available from Intel Corporation of Santa Clara, Calif., USA, and the Phenom™ processor available from Advanced Micro Devices of Sunnyvale, Calif., USA, although implementations herein are not limited to any particular multi-core processor. In addition, the processor 102 may be reprogrammable hardware such as Field Programmable Gate Arrays (FPGA), or even dedicated hardware engines. In one example illustrated, one or more cores can be allocated for performing processing for the SDR, while other remaining cores can perform processing for other applications, the operating system, or the like. Further, in some implementations, two or more processors 102 can be provided, and cores 104 across the two or more processors 102 can be used for SDR processing. Throughout the disclosure, the processors 102 can interchangeably be referred to as processing circuitry or circuitry.

The processor 102 is in communication via bus interface 110 with a high-throughput, low-latency bus 112, and thereby to a system memory 114. The bus 112 may be a Pete bus or other suitable bus having a high data throughput with low latency. Further, the bus 112 is also in communication with a radio controller 116. As is discussed further below, the radio controller 116 may be coupled to an interchangeable radio front end (RF front end) 118. The RF front end 118 is a hardware module that receives and/or transmits radio signals through an antenna (not shown in FIG. 1). In some implementations of the SDR architecture herein, the RF front end 118 represents a well-defined interface between the digital and analog domains. For example, in some implementations, the RF front end 118 may include analog-to-digital (A/D) and digital-to-analog (D/A) converters, and necessary circuitry for radio frequency transmission, as is discussed further below.

During receiving, the RF front end 118 acquires an analog RF waveform 120 from the antenna, possibly down-converts the waveform to a lower frequency, and then digitizes the analog waveform into discrete digital samples 122 before transferring the digital samples 122 to the radio controller 116. During transmitting, the RF front end 118 accepts a stream of software-generated digital samples 122 from a software radio stack 124 (i.e., software that generates the digital samples, as discussed below), and synthesizes the corresponding analog waveform 120 before emitting the waveform 120 via the antenna. Since all signal processing is done in software on the processor 102, the design of RF front end 118 can be rather generic. For example, the RF front end 118 can be implemented in a self-contained module with a standard interface to the radio controller 116. Multiple wireless technologies defined on the same frequency band can use the same RF front end hardware 118. Furthermore, various different RF front ends 118 designed for different frequency bands can be coupled to radio controller 116 for enabling radio communication on various different frequency bands. Therefore, implementations herein are not limited to any particular frequency or wireless technology.

According to some implementations herein, the radio controller 116 is a PC interface board optimized for establishing a high-throughput, low-latency path for transferring high-fidelity digital signals between the RF front end 118 and memory 114. The interfaces and connections between the radio front end 118 and multi-core processor 102 can enable sufficiently high throughput to transfer high-fidelity digital waveforms. Accordingly, to achieve a predetermined system throughput, some implementations of the radio controller 116 use a high-speed, low-latency bus 112, such as PCIe. With a maximum throughput of 64 Gbps (e.g., PCIe x32) and sub-microsecond latency, PCIe is easily able to support multiple gigabit data rates for sending and receiving wireless signals over a very wide band or over many MIMO channels. Further, the PCIe interface is typically common in many conventional general-purpose computing devices. The radio controller 116 can also be a dedicated hardware bus connection, and may even be co-located with the processor 102 and the RF front end 118.

One role of the radio controller 116 is to act as a bridge between the synchronous data transmission at the RF front end 118 and the asynchronous processing on the processor 102. The radio controller 116 implements various buffers and queues, together with a large onboard memory, to convert between synchronous and asynchronous streams and to smooth out bursty transfers between the radio controller 116 and the system memory 114. The large onboard memory further allows caching of pre-computed waveforms for quick transmission of the waveforms, such as when acknowledging reception of a transmission, thereby adding additional flexibility for software radio processing.

In addition, the radio controller 116 provides a low-latency control path for software to control the RF front end hardware 118 and to ensure that the RF front end 118 is properly synchronized with the processor 102. For example, wireless protocols have multiple real-time deadlines. Consequently, not only is processing throughput a critical requirement, but the processing latency should also meet certain response deadlines. For example, some Media Access Control (MAC) protocols also require precise timing control at the granularity of microseconds to ensure certain actions occur at exactly pre-scheduled time points. The radio controller 116 of implementations herein also provides for such low latency control.

Figure 2:
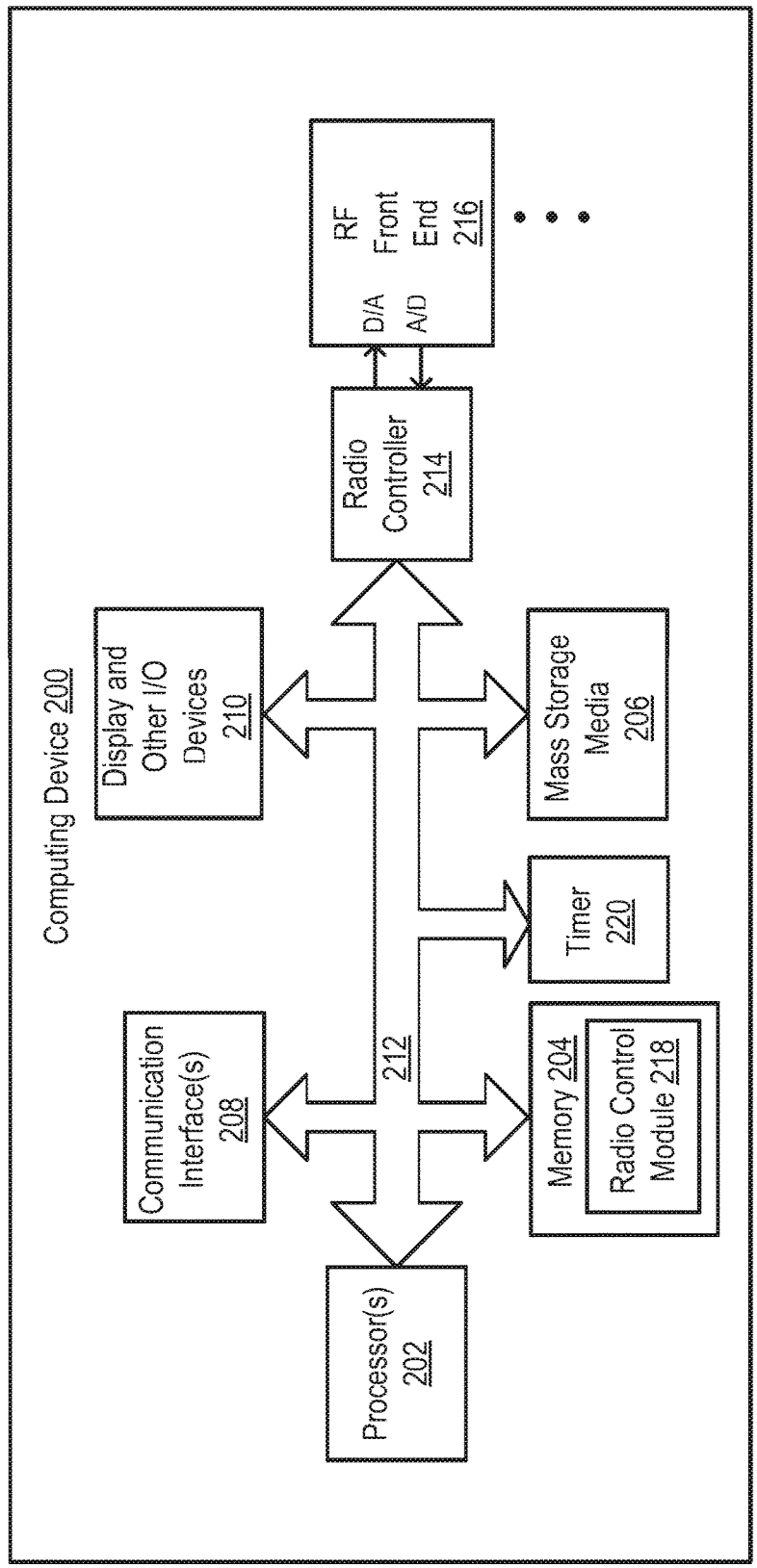
FIG. 2 is an exemplary diagram of a hardware and logic configuration of a computing device, according to certain embodiments.

FIG. 2 illustrates an exemplary depiction of a computing device 200 that can be used to implement the SDR implementations described herein, such as the SDR platform and system 100 described above with reference to FIG. 1. In the implementations described further herein, the computing device 200 may be any hardware device that can perform wireless communications, such as a wireless access point or mobile device that can implement one or more wireless communication protocols, such as abuse station, switch, router, user equipment (UE), and the like. Throughout the disclosure, the terms computing device and SDR can be used interchangeably.

The computing device 200 includes one or more processors 202, a memory 204, one or more mass storage devices or media 206, communication interfaces 208, and a display and other input/output (I/O) devices 10 in communication via a system bus 212. In addition, the computing device 200 can also include one or more timer blocks 220 in order to provide a notion of time to the various components of the computing device 200. Memory 204 and mass storage media 206 are examples of computer-readable storage media able to store instructions which cause computing device 200 to perform the various functions described herein when executed by the processor(s) 202. For example, memory 204 may generally include both volatile memory and non-volatile memory (e.g., RAM, ROM, or the like). Further, mass storage media 206 may generally include hard disk drives, solid-state drives, removable media, including external and removable drives, memory cards, Flash memory, or the like. The computing device 200 can also include one or more communication interfaces 208 for exchanging data with other devices, such as via a network, direct connection, or the like, as discussed above. The display and other input/output devices 210 can include a specific output device for displaying information, such as a display, and various other devices that receive various inputs from a user and provide various outputs to the user, and can include, for example, a keyboard, a mouse, audio input/output devices, a printer, and so forth.

Computing device 200 further includes radio controller 214 and RF front end 216 for implementing the SDR herein. For example, system bus 212 may be a PCIe compatible bus, or other suitable high throughput, low latency bus. The radio controller 214 and the RF front end 216 may correspond to the radio controller 116 and the RF front end 118 described previously with reference to FIG. 2, and as also described below, such as with reference to FIG. 3. Furthermore, a radio control module 218 can include software instructions stored in memory 204 or other computer-readable storage media for controlling operations on radio controller 214, as is described additionally below. The computing device 200 described herein is only one example of a computing environment and is not intended to suggest any limitation as to the scope of use or functionality of the computer architectures that can implement the SDR herein. Neither should the computing device 200 be interpreted as having any dependency or requirement relating to any one or combination of components illustrated in the computing device 200.

Furthermore, implementations of SDR platform and system 100 described above can be employed in many different computing environments and devices for enabling a software defined radio in addition to the example of computing device 200 illustrated in FIG. 2. Generally, many of the functions described with reference to the figures can be implemented using software, hardware (e.g., fixed logic circuitry), manual processing, or a combination of these implementations. The term "logic", "module" or "functionality" as used herein generally represents software, hardware, or a combination of software and hardware that can be configured to implement prescribed functions. For instance, in the case of a software implementation, the term "logic," "module," or "functionality" can represent program code (and/or declarative-type instructions) that perform specified tasks when executed on a processing device or devices (e.g., CPUs or processors). The program code can be stored in one or more computer readable memory devices, such as memory 204 and/or mass storage media 206, or other computer readable storage media. Thus, the methods and modules described herein may be implemented by a computer program product. The computer program product may include computer-readable media having a computer-readable program code embodied therein. The computer-readable program code may be adapted to be executed by one or more processors to implement the methods and/or modules of the implementations described herein. The terms "computer-readable storage media", "processor-accessible storage media", or the like, refer to any kind of machine storage medium for retaining information, including the various kinds of memory and storage devices discussed above.

Figure 3:
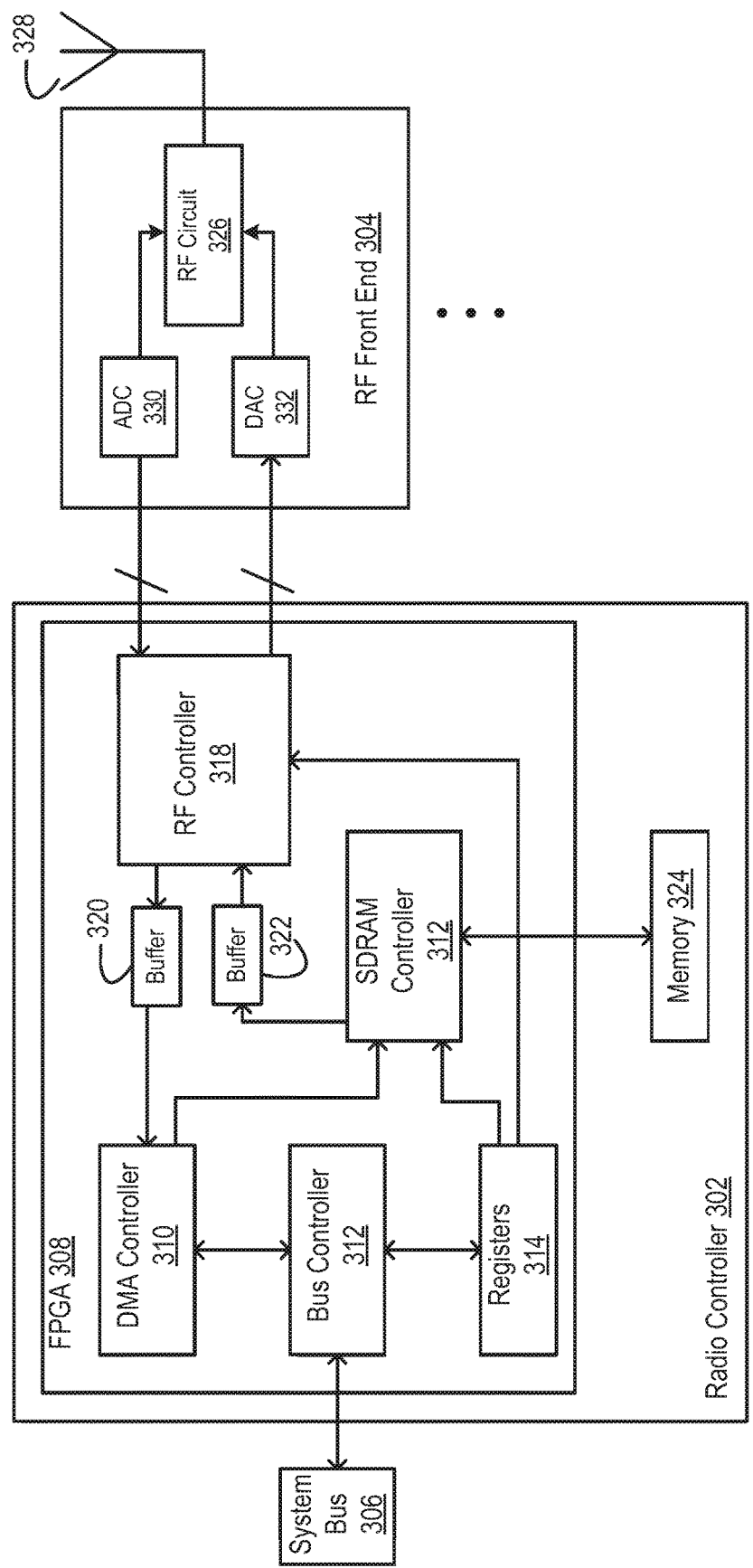
FIG. 3 is an exemplary diagram of a radio controller and a RF front end, according to certain embodiments.

FIG. 3 illustrates an exemplary implementation of a radio controller 302 and RF front end 304 that may correspond to the radio controller 116, 214 and RF front end 118, 216 described previously. In the example illustrated, the radio controller 302 includes functionality for controlling the transfer of data between the RF front end 304 and a system bus 306, such as buses 112, 212 discussed previously. In the illustrated implementation, the functionality is a field-programmable gate array (FPGA) 308, which may be a Virtex-5 FPGA available from Xilinx, Inc., of San Jose, Calif., USA, one or more other suitable FPGAs, or other equivalent circuitry configured to accomplish the functions described herein. The radio controller 302 includes a direct memory access (DMA) controller 310, a bus controller 312, registers 314, an SDRAM controller 316, and an RF controller 318. The radio controller 302 further includes a first FIFO buffer 320 for acting as a first FIFO for temporarily storing digital samples received from RF front end 304, and a second FIFO buffer 322 for temporarily storing digital samples to be transferred to RF front end 304. The DMA controller 310 controls the transfer of received digital samples to the system bus 306 via the bus controller 312. SDRAM controller 316 controls the storage of data in onboard memory 324, such as digital samples, pre-generated waveforms, and the like.

The radio controller 302 can connect to various different RF front ends 304. In some implementations, the RF front end 304 includes an RF circuit 326 configured as an RF transceiver for receiving radio waveforms from an antenna 328 and for transmitting radio waveforms via antenna 328. The RF front end 304 further may include an analog-to-digital converter (ADC) 330 and a digital-to-analog converter (DAC) 332. As discussed previously, analog-to-digital converter 330 converts received radio waveforms to digital samples for processing, while digital-to-analog converter 332 converts digital samples generated by the processor to radio waveforms for transmission by RF circuit 326. Furthermore, it should be noted that implementations herein are not limited to any particular front end 304, and in some implementations, the entire front end 304 may be incorporated into the radio controller 302. Alternatively, in other implementations, analog-to-digital converter 330 and digital-to-analog converter 332 may be incorporated into the radio controller 302, and RF front end 304 may merely have an RF circuit 326 and antenna 328. Other variations may also be apparent in view of the disclosure herein.

In the implementation illustrated in FIG. 3, the DMA controller 310 and bus controller 312 interface with the memory and processor on the computing device (not shown in FIG. 3) and transfer digital samples between the radio controller 302 and the system memory on the computing device, such as memory 114, 204 discussed above. The radio controller software control module 218 discussed above with reference to FIG. 2 sends commands and reads radio controller states through radio controller registers 314. The radio controller 302 further uses onboard memory 324 as well as small FIFO buffers 320, 322 on the FPGA 308 to bridge data streams between the processor on the computing device and the RF front end 304. When receiving radio waveforms, digital signal samples are buffered in on-chip FIFO buffer 320 and delivered into the system memory on the computing device when the digital samples fit in a DMA burst (e.g., 128 bytes). When transmitting radio waveforms, the large radio controller memory 324 enables implementations of the radio controller manager module 218 (e.g., FIG. 2) to first write the generated samples onto the radio controller memory 324, and then trigger transmission with another command to the radio controller 302. This functionality provides flexibility to the implementations of the SDR manager module 218 for pre-calculating and storing of digital samples corresponding to several waveforms before actually transmitting the waveforms, while allowing precise control of the timing of the waveform transmission.

Figure 4:
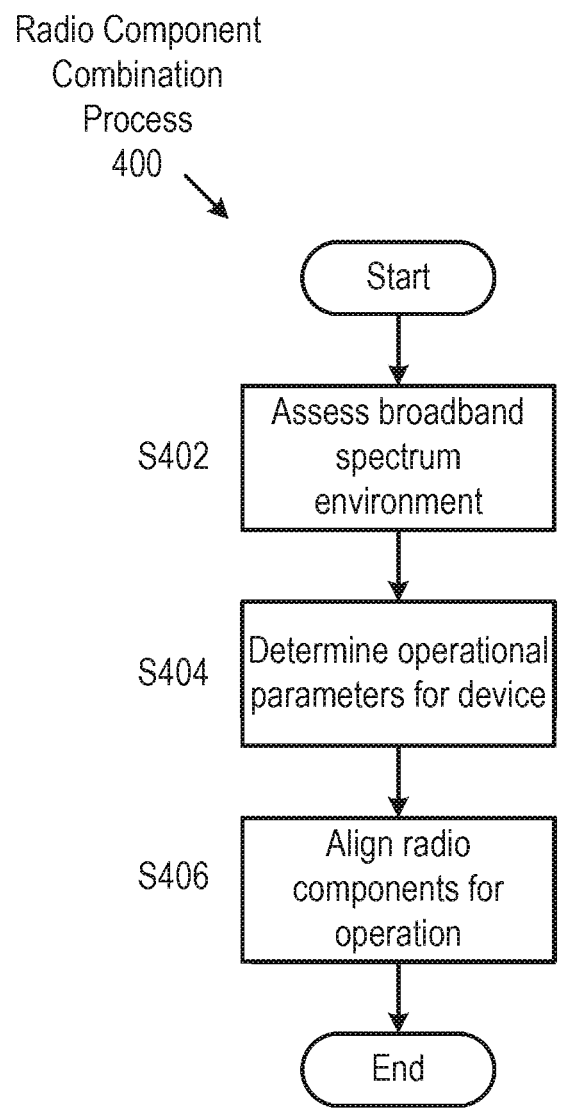
FIG. 4 is an exemplary flowchart of a radio component combination process, according to certain embodiments.

FIG. 4 is an exemplary flowchart of a radio component combination process 400, according to certain embodiments. The steps of the radio component combination process 400 can be performed by processing circuitry of the computing device 200 that is configured with one or more RF front ends 216. For example, the one or more RF front ends 216 can include any combination of transmitter circuits, receiver circuits, or integrated transceiver circuits. Details regarding implementations of the RF front end 216 are discussed further herein.

In certain embodiments, the radio component combination process 400 can include integrating components from multiple computing devices 200 to improve the performance of the computing devices. For example, processing resources and/or RF front end 216 resources from the computing devices 200 can be combined in series or parallel where of the computing devices 200 acts as a controlling device for the other computing devices 200. In an example, one computing device 200 may have a receiver and/or transmitter circuit that s not currently being used and can offer receiver and/or transmitter circuit as a resource that can used by another computing device 200.

At step S402, the processing circuitry of the computing device 200 captures and assesses a broadband spectrum environment via a receiver at the RF front end 216. SDR implementations allow the computing device 200 to instantaneously assess the broadband spectrum environment via the RF front end 216 receivers. The SDR system 100 implemented in the computing device 200 provides flexibility to operate at wide frequency ranges that are able to simultaneously detect blockers, image signals, and other types of noise present in multiple frequency bands of multiple wireless communication system protocols. In some embodiments, the RF front end 216 of the computing device 200 includes a broadband receiver that captures the broadband spectrum environment. In another implementation, the RF front end 216 of the computing device 200 includes multiple narrowband receivers that are able to simultaneously capture a spectrum environment of individual frequency bands that encompass the broadband spectrum environment.

At step S404, the processing circuitry determines operational parameters for the RF front end components as well as backend components of the computing device 200. Throughout the disclosure, references to the backend of the computing device 200 refer to any components that are not associated with the RF front end 216, such as the processor 202, bus 212, memory 204, and the like. For example, in SDR implementations, functionality of some radio components is achieved through execution of one or more software processes by the processing circuitry of the processor 202 rather than through dedicated hardware components, which can be referred to as software defined components. For example, the filter components, and digital signal processor may be software defined components of the SDR. In addition, some of the components of the RF front end 216 can also be executed as software defined components and/or are configured by the software defined components. For example, the configuration of the ADCs of the receiver can be modified by control signals issued by the processing circuitry.

The operational parameters of the SDR can be modified by modifying the configuration of the hardware components of the RF front end 216 or by modifying one or more parameters associated with the software processes executed by the processing circuitry. The operational parameters can include characteristics of the RF front end 216 and backend that affect how signals are transmitted and/or received. For example, dynamic range, sample rate, clock frequency, analog-to-digital converter (ADC) configuration, amplifier gain, filter configuration, and the like, are examples of the operational parameters of the components the computing device 200 implementing the SDR platform and system 100.

At step S406, radio components of the RF front end 216 of the computing device 200 are aligned based on the determined operational parameters. In one implementation, the RF front end 216 includes a receiver with multiple receiver paths having varied dynamic ranges. The processing circuitry of the computing device 200 can issue control signals to align the receiver path that has a dynamic range that corresponds to the dynamic range determined at step S404. In implementations where components from multiple computing devices 200 are combined, the controlling computing device 200 can selects an unused receiver from a group of computing devices 200 that has dynamic range that corresponds to the determined dynamic range. In a similar way, the processing circuitry issues control signals to modify hardware configurations of the RF front end 216 as well as modify one or more parameters of the software defined components to achieve the operational parameters for the SDR.

Figure 5:
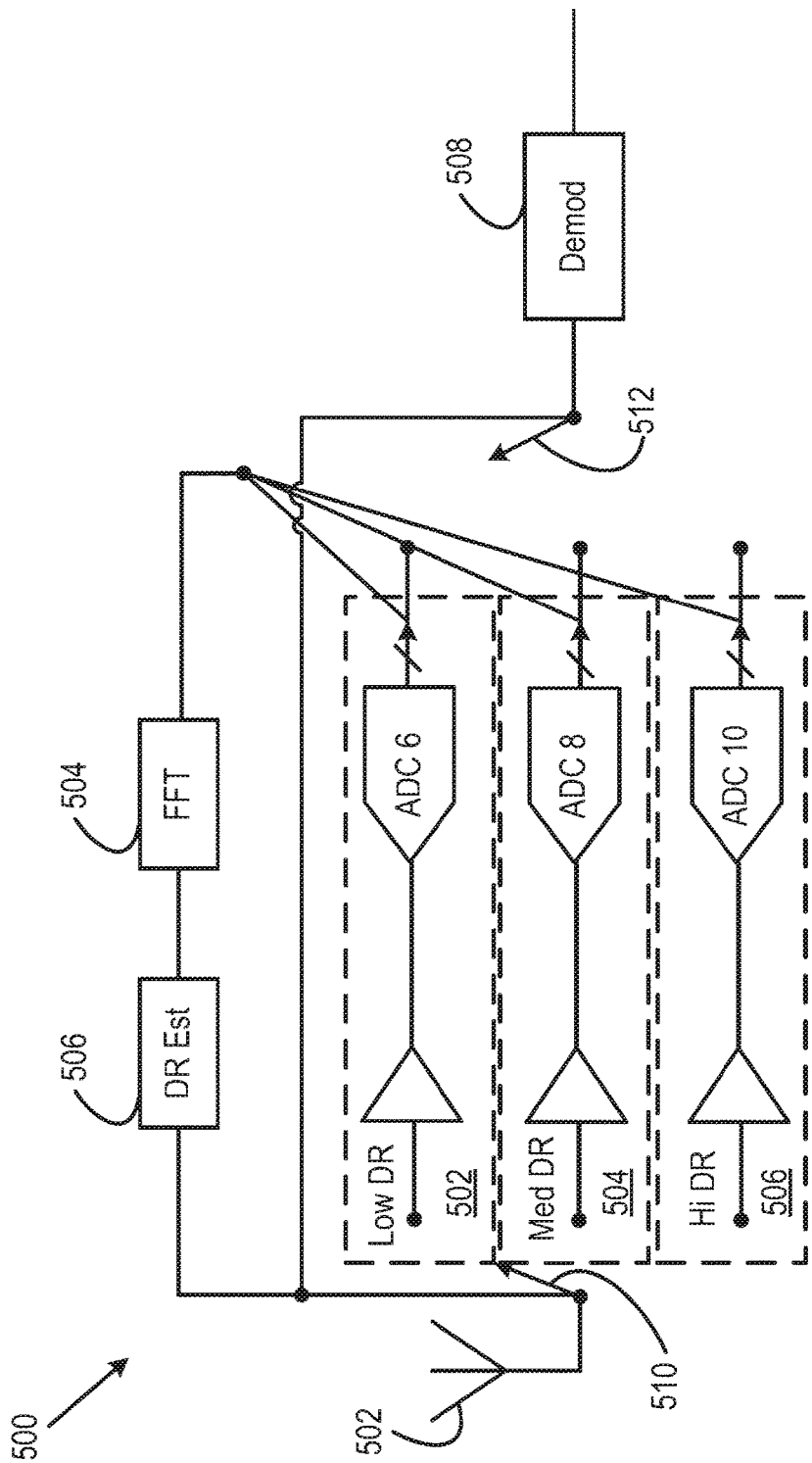
FIG. 5 is an exemplary schematic diagram of an adaptive variable dynamic range receiver, according to certain embodiments.

FIG. 5 is an exemplary schematic diagram of an adaptive variable dynamic range receiver 500, according to certain embodiments. The receiver 500 is one example of the RF front end 216 that can be implemented in the computing device 200. The receiver includes at least one antenna 502 having multiple receiver paths 502, 504, and 506 that have varied dynamic ranges. The dynamic range of a receiver path is an indicator of a difference in signal power between a minimum discernable signal and a signal that causes a predetermined amount of harmonic distortion at a receiver output. For the receiver 500, the receiver path 502 has a lowest dynamic range, the receiver path 506 has a highest dynamic range, and the receiver path 504 has a dynamic range that is between the dynamic ranges of the receiver paths 502 and 506, which can also be referred to as a middle dynamic range. In addition, processing received signals from the receiver path 506 having the highest dynamic range is more costly than processing signals from the other receiver paths 502 and 504. The receiver 500 may also have greater than or fewer than three receiver paths with various ADC bit-rates, amplifier gain values, and the like.

Each of the receiver paths 502, 504, and 506 can be aligned for operation via a switch 510 connecting one of the receiver paths 502, 504, or 506 to the antenna as well as a switch 512 connecting the receiver path 502, 504, or 506 to the backend of the computing device 200 for processing of the received signal. Demodulator 508 can be a software defined component that is executed by the processing circuitry of the computing device 200 which demodulates the received signal for processing. In addition the processing circuitry can also implement Fast Fourier Transform (FFT) block 504 and/or dynamic range (DR) estimation block 506. The FFT block 504 detects blockers in the received signal. In certain embodiments, other techniques than FFT can also be used detect the blockers. Throughout the disclosure, the terms blocker and blocker signal can be used interchangeably and refer to any type of signal that produces interference in a received signal.

In some implementations, the receiver path 506 having the highest dynamic range is used to assess the spectrum environment in order to detect strength and location of blockers or any type of signal that produces interference with a desired signal, which is a part of the received signal that does not include interference from the blockers. Once the strength and location of the blockers is known for the spectrum, the processing circuitry can select one of the receiver paths 502, 504, or 506 based on properties of the blockers and the desired signal. The processing circuitry can also determine other operational parameters of the computing device 200 based on the assessed spectrum environment, such as the sampling rate of the receiver 500.

At the DR estimation block 506, the processing circuitry of the computing device 200 determines a dynamic range for the receiver 500 based on characteristics of the received signal and the blockers. For example, increasing the dynamic range of the receiver 500 provides improved blocker detection performance, which may be advantageous for a spectrum environment that has relatively strong blocker signal strength and/or relatively weak desired signal strength. If the blocker signal strength is greater than a predetermined blocker threshold and/or signal strength of a desired signal is less than a predetermined signal threshold, then the dynamic range of the of the receiver 500 may be increased. For example, the receiver path 502, 504, or 506 having a dynamic range that is greater than or equal to a currently selected receiver path is selected, and the processing circuitry issues control signals to the switches 510 and 512 to align the selected receiver path for operation. In addition, decreasing the dynamic range of the receiver 500 reduces blocker signal detection performance but reduces processing burden and power consumption, which can be implemented when the blocker signal strength is relatively weak and/or the desired signal strength is relatively strong. If the blocker signal strength is less than the predetermined blocker threshold and/or the signal strength of a desired signal is greater than the predetermined signal threshold, the dynamic range of the receiver may be decreased.

Figure 6:
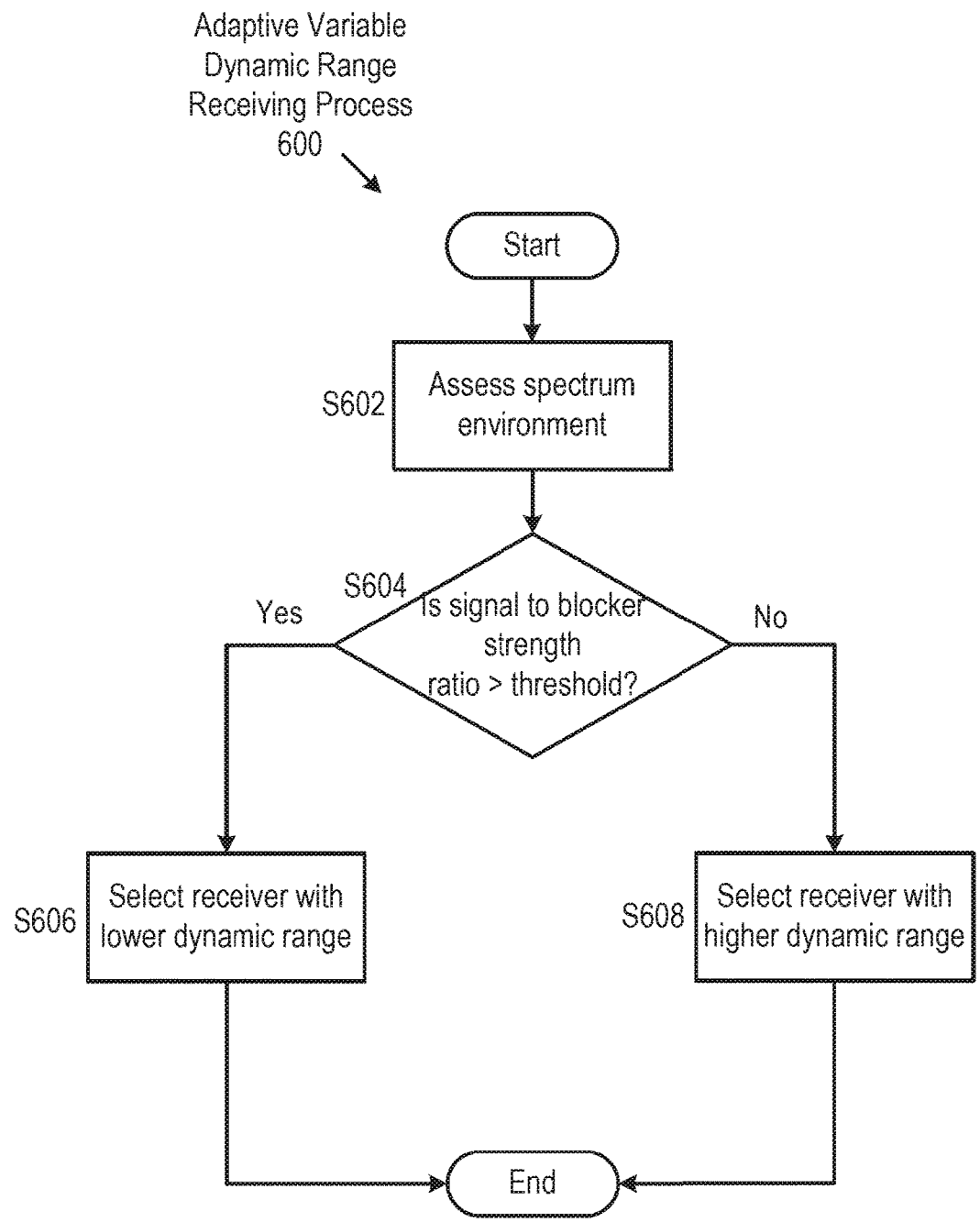
FIG. 6 is an exemplary flowchart of an adaptive variable dynamic range receiving process, according to certain embodiments.

FIG. 6 is an exemplary flowchart of an adaptive variable dynamic range receiving process 600, according to certain embodiments. The steps of the adaptive variable dynamic range process 600 are described with respect to the receiver 500 but can also be implemented with other receiver configurations, such as receiver configurations with greater or fewer numbers of receiving paths or receiver configurations that use different blocker detection techniques.

At step S602, the processing circuitry of the computing device 200 assesses the broadband spectrum environment via the receiver 500 that is aligned at a first dynamic range. In some implementations, the receiver path 506 having the highest dynamic range is used to assess the spectrum environment in order to detect strength and location of blockers or any type of signal that produces interference with a desired signal, which is a part of the received signal that does not include interference from the blockers. However, the other receiver paths 502 and 504 can also be aligned to assess the spectrum environment. Once the strength and location of the blockers is known for the spectrum, the processing circuitry can select one of the receiver paths 502, 504, or 506 based on properties of the blockers and the desired signal. The processing circuitry of the computing device 200 can perform the broadband spectrum environment assessment at predetermined time intervals or when a change in signal strength or blocker strength is greater than a predetermined threshold.

At step S604, the processing circuitry determines whether a signal to blocker strength ratio is greater than a predetermined threshold. In some implementations, the signal to blocker strength ratio provides an indication of how much of an effect the blocker has on the desired signal component of the received signal and whether to increase or decrease the dynamic range of the receiver 500. For example, signal to blocker strength ratios that are greater than the predetermined threshold may indicate that the blocker strength is weak enough that reception of the desired signal is not affected. Therefore, if the signal to blocker strength ratio is greater than the predetermined threshold, the processing circuitry of the computing device may determine that the dynamic range of the receiver can be decreased. Likewise, signal to blocker strength ratios that are less than the predetermined threshold may indicate that the blocker strength is strong enough and/or the signal strength is weak enough that reception of the desired signal may be affected by the presence of the blockers.

Therefore, if the signal to blocker strength ratio is less than or equal to the predetermined threshold, the processing circuitry of the computing device may determine that the dynamic range of the receiver can be increased. If the signal to blocker strength ratio is greater than the predetermined threshold, resulting in a "yes" at step S604, then step S606 is performed. Otherwise, if the signal to blocker strength ratio is less than or equal to the predetermined threshold, resulting in a "no" at step S604, then step S608 is performed.

In addition to determining the signal to blocker strength ratio the processing circuitry can determine whether to increase or decrease the dynamic range of the receiver based on individual values of the blocker strength and the desired signal strength. For example, if the blocker signal strength is greater than a predetermined blocker threshold and/or signal strength of a desired signal is less than a predetermined signal threshold, then the dynamic range of the of the receiver 500 may be increased, and step S606 is performed. Likewise, if the blocker signal strength is less than the predetermined blocker threshold and/or the signal strength of a desired signal is greater than the predetermined signal threshold, the dynamic range of the receiver may be decreased, and step S608 is performed.

At step S606, if it is determined at step S604 that the signal to blocker strength ratio is greater than the predetermined threshold, then the receiver path having a lower dynamic range is selected. The receiver path 502, 504, or 506 having a dynamic range that is greater than or equal to a currently selected receiver path is selected, and the processing circuitry issues control signals to the switches 510 and 512 to align the selected receiver path for operation. For example, if the receiver path 502 is currently selected, the switches 510 and 512 can align the receiver path 504 or the receiver path 506 for operation. If the receiver path 506 having the highest dynamic range is currently selected when the adaptive variable dynamic range process 600 is initiated, then the receiver path 506 can remain the selected receiver path.

At step S608, if it is determined at step S604 that the signal to blocker strength ratio is less than or equal to the predetermined threshold, then a receiver path having a higher dynamic range is selected. The receiver path 502, 504, or 506 having a dynamic range that is less than or equal to a currently selected receiver path is selected, and the processing circuitry issues control signals to the switches 510 and 512 to align the selected receiver path for operation. For example, if the receiver path 506 is currently selected, the switches 510 and 512 can align the receiver path 504 or the receiver path 502 for operation. If the receiver path 502 having the lowest dynamic range is currently selected when the adaptive variable dynamic range process 600 is initiated, then the receiver path 502 can remain the selected receiver path.

Figure 7:
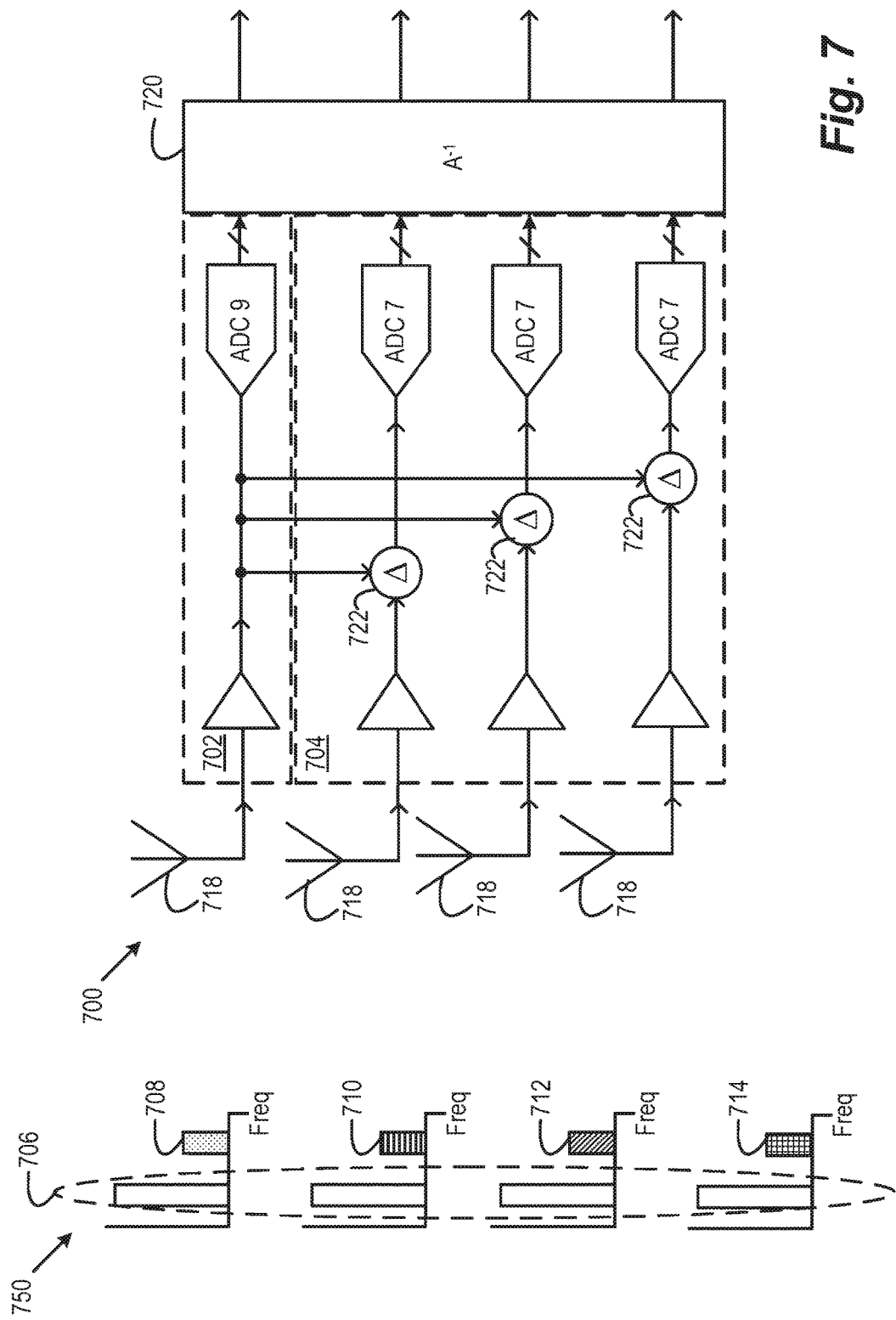
FIG. 7 is an exemplary schematic diagram of a multi-input, multi-output (MIMO) receiver, according to certain embodiments.

FIG. 7 is an exemplary schematic diagram of a multi-input, multi-output (MIMO) receiver 700, according to certain embodiments. The receiver 700 is one example of the RF front end 216 that can be implemented in the computing device 200. The receiver includes a plurality of MIMO antennas 718 each having a corresponding receiver path. In some implementations, one receiver path 702 of a group of MEMO receiver paths is an analog receiver path that has a higher dynamic range than other receiver paths 704 of the group of MIMO receiver paths.

The graphs 750 in FIG. 7 represent received signals at each of the MIMO antennas 718. For example, blockers 706 interfere with desired MIMO signals 708, 710, 712, and 714. The desired MIMO signals 708, 710, 712, and 714 are not correlated due to design criteria of MIMO signals, such as spatial diversity specifications. However, because the blockers 706 can be from a common source, the blockers 706 or any other undesired signal components at each of the MIMO antennas 718 can be correlated. Therefore, characteristics of a blocker 706 detected by any of the MIMO receiver paths of the MIMO receiver 700 can be used to remove the blocker from the received signal at any of the other MIMO receiver paths. For example, the receiver path 702 having the highest dynamic range may be used for blocker detection and isolation because receiver paths with a higher dynamic range may provide greater blocker detection performance than receiver paths with a lower dynamic range with respect to identifying frequency locations and signals strengths of the blockers.

In one implementation, the processing circuitry of the computing device 200 computes blocker removal components 722 for the other MIMO receiver paths 702 based on characteristics of the blockers 706 detected at the receiver path 702 having a highest dynamic range. Applying the blocker removal components 722 to the MIMO receiver paths 704 subtracts the blockers 706 from the received signals so that only the desired signals 708, 710, 712, and 714 are processed by the receiver 700. Implementing a combination of lower dynamic range receiver paths 704 with a higher dynamic range receiver path 702 provides overall reduced hardware and processing costs along with less power consumption. In addition, the SDR allows for broadband spectrum analysis and adaptive computation of the blocker removal components 722 in response to a changing spectrum environment.

To recover the received signals 708, 710, 712, and 714 after application of the blocker removal components 722, an inverse of a signal recovery matrix 720, $A^{-1}$ is applied to the signals for each of the receiver paths. In some implementations, A, is a non-invertible matrix that can be defined by Equation (1), where $\delta_1$, $\delta_2$, and $\delta_3$ represent values for the blocker removal components 722 for each of the three receiver paths 704.

$$A = \begin{bmatrix} 1 & 0 & 0 & 0 \\ 0 & 1 & 0 & 0 \\ 0 & 0 & 1 & 0 \\ 0 & 0 & 0 & 1 \end{bmatrix} + \begin{bmatrix} 0 & 0 & 0 & 0 \\ \delta_1 & 0 & 0 & 0 \\ \delta_2 & 0 & 0 & 0 \\ \delta_3 & 0 & 0 & 0 \end{bmatrix} \quad (1)$$

Figure 8:
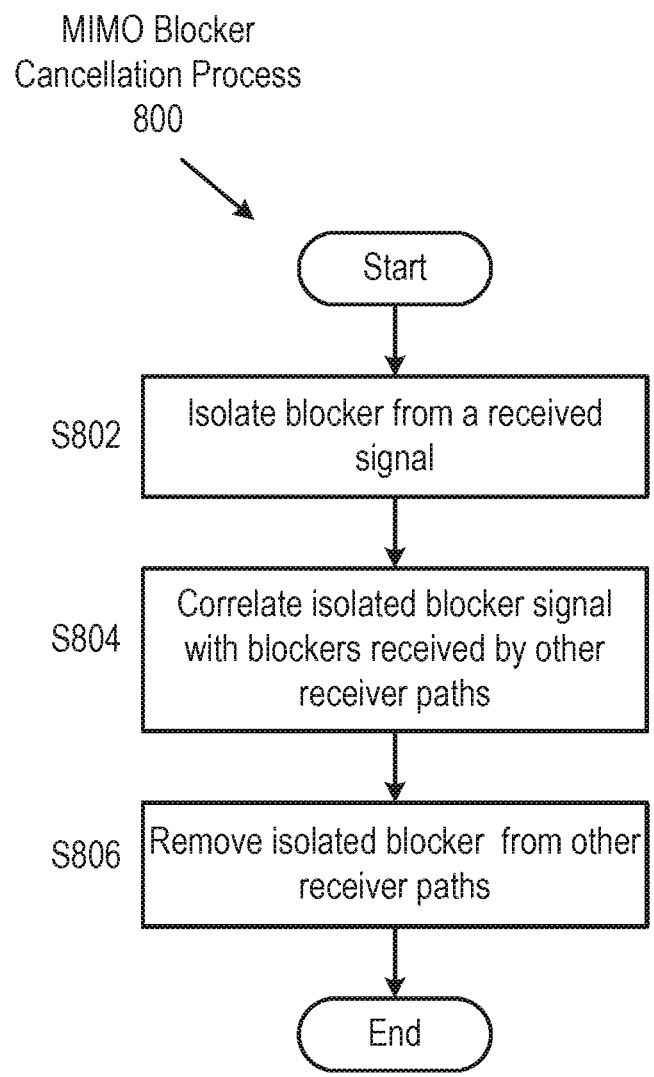
FIG. 8 is an exemplary flowchart of a MIMO blocker cancellation process, according to certain embodiments.

FIG. 8 is an exemplary flowchart of a MEMO blocker cancellation process 800, according to certain embodiments. The steps of the MIMO blocker cancellation process 800 are described with respect to the receiver 500 but can also be implemented with other receiver configurations, such as receiver configurations with greater or fewer numbers of receiving paths or receiver configurations that use different blocker detection techniques.

At step S802, the receiver 700 configured with one or more MIMO antennas 718 detects and isolates one or more blockers 706 from a received signal. In some implementations, one receiver path 702 of a group of MIMO receiver paths is an analog receiver path that has a higher dynamic range than other receiver paths 704 of the group of MIMO receiver paths. The receiver path 702 may be used for blocker detection and isolation because receiver paths with a higher dynamic range may provide greater blocker detection performance than receiver paths with a lower dynamic range with respect to identifying frequency locations and signals strengths of the blockers.

At step S804, the processing circuitry correlates the blockers 706 across all of the MIMO receiver paths 702 and 704. Because the blockers 706 present at the antennas 718 of the receiver 700 are from a common source, the blockers 706 or any other undesired signal components at each of the MIMO antennas 718 can be correlated while the desired signal components 708, 710, 712, and 714 are not correlated due to the design criteria of MIMO signals. Therefore, characteristics of a blocker 706 detected by any of the MIMO receiver paths of the MIMO receiver 700 can be used to remove the blocker from the received signal at any of the other MIMO receiver paths.

At step S806, the blockers 706 are removed from the lower dynamic range receiver paths 704 so that only a desired signal components 708, 710, 712, and 714 are processed by receiver. In one implementation, the processing circuitry of the computing device 200 computes blocker removal components 722 for the other MIMO receiver paths 702 based on characteristics of the blockers 706 detected at the receiver path 702 having a highest dynamic range. Applying the blocker removal components 722 to the MIMO receiver paths 704 subtracts the blockers 706 from the received signals so that only the desired signals 708, 710, 712, and 714 are processed by the receiver 700. Implementing a combination of lower dynamic range receiver paths 704 with a higher dynamic range receiver path 702 provides overall reduced hardware and processing costs along with less power consumption. In addition, the SDR allows for broadband spectrum analysis and adaptive computation of the blocker removal components 722 in response to a changing spectrum environment.

Figure 9:
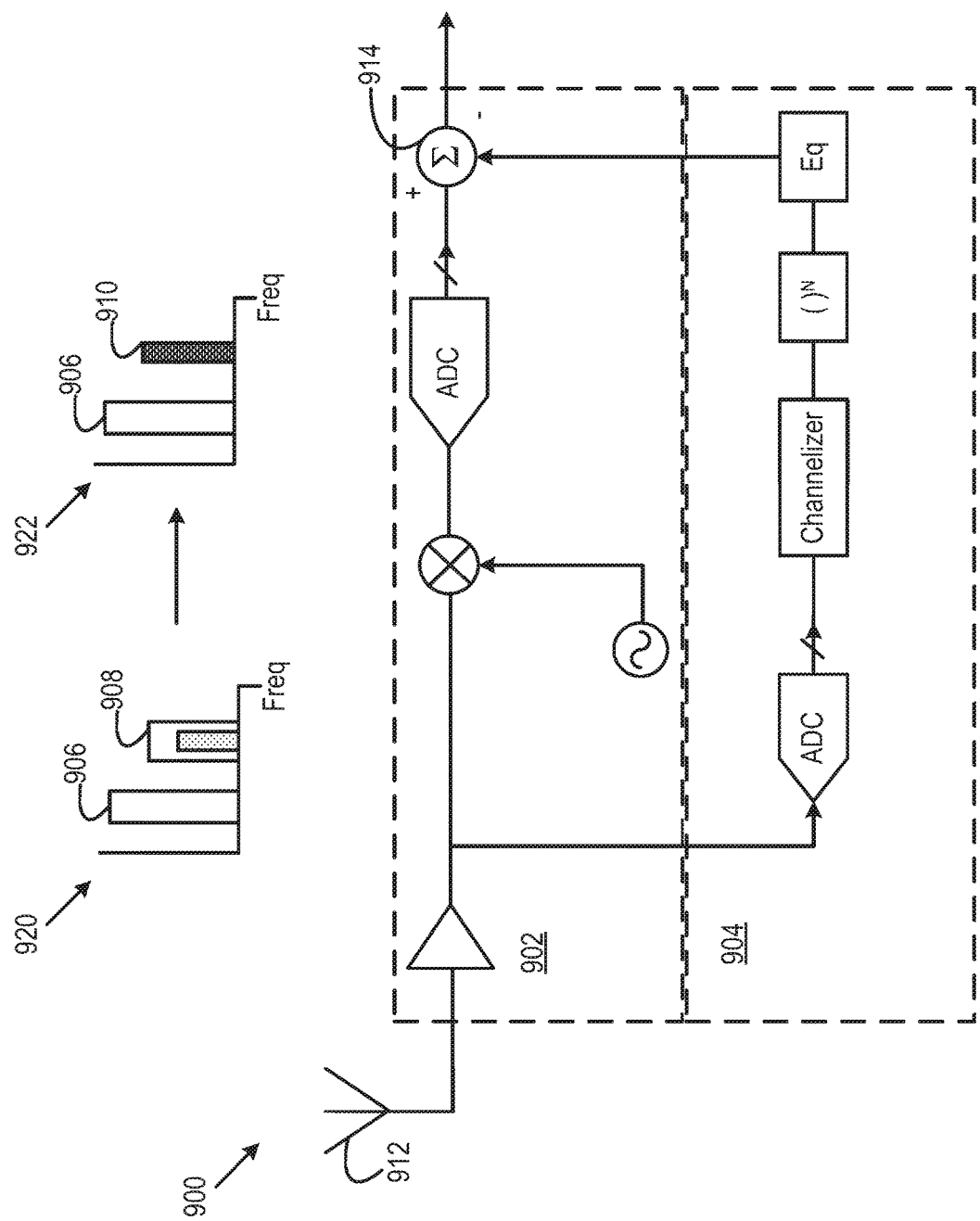
FIG. 9 is an exemplary schematic diagram of a distortion cancelling receiver, according to certain embodiments.

FIG. 9 is an exemplary schematic diagram of a distortion cancelling receiver 900, according to certain embodiments. The receiver 900 is one example of the RF front end 216 that can be implemented in the computing device 200. The receiver 900 includes an antenna 912 connected to a primary receiver path 902 in parallel with an auxiliary receiver path 904. The auxiliary receiver path 904 includes a channelizer to divide a broadband signal into segments that can be processed more efficiently and an equalizer. As shown in the graph 920, an interference signal 906, such as a blocker, image, and the like, causes distortion of a received signal 908 that makes it difficult to isolate a desired signal component from the received signal 908.

In some implementations, the auxiliary receiver path 904 acquires the interference signals 906, and the primary receiver path 902 uses the acquired interference signals 906 to cancel the distortion in the received signal 910 at summation block 914 as shown in the graph 922. Also, the auxiliary receiver path 904 may have a dynamic range that is less than a dynamic range of the primary receiver path 902. In implementations where receiver components from multiple computing devices 200 are combined, the controlling computing device 200 can selects an unused receiver from a group of computing devices 200 to function as the primary receiver path 902 or the auxiliary receiver path 904. Implementing the computing device with a SDR allows the receiver 900 to instantaneously detect the interference signals 906 across a broadband spectrum environment so that the distortions caused by the interference signals 906 can be removed from the received signals.

Figure 10:
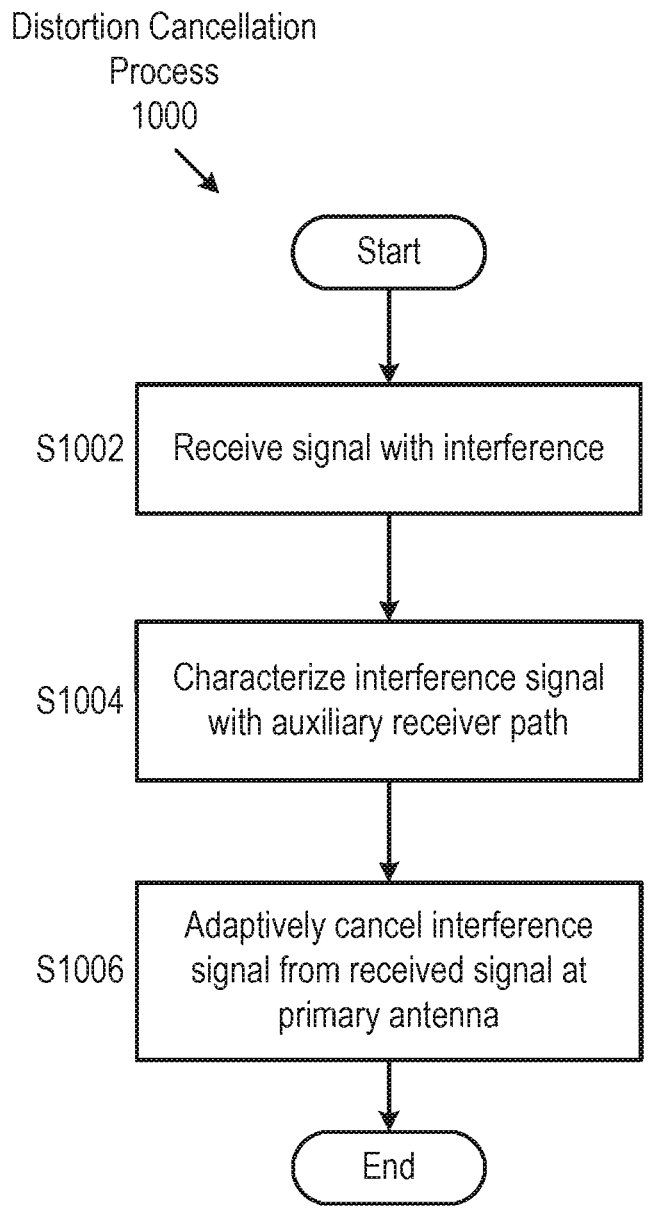
FIG. 10 is an exemplary flowchart of a distortion cancellation process, according to certain embodiments.

FIG. 10 is an exemplary flowchart of a distortion cancellation process 1000, according to certain embodiments. The steps of the distortion cancellation process 1000 are described with respect to the receiver 500 but can also be implemented with other receiver configurations.

At step S1002, the receiver 900 receives a signal that includes interference from blocker signals. As shown in the graph 920, an interference signal 906, such as a blocker, image, and the like, causes distortion of a received signal 908 that makes it difficult to isolate a desired signal component from the received signal 908.

At step S1004, the computing device 200 characterizes the interference signal 906 via the auxiliary receiver path 904. The auxiliary receiver path 904 includes and ADC, a channelizer to divide a broadband signal into segments that can be processed more efficiently, and an equalizer to process the received signal and acquire the interference signal 906. In some implementations, the auxiliary receiver path 904 may have a dynamic range that is less than a dynamic range of the primary receiver path 902.

At step S1006, the receiver 900 adaptively cancels the interference signal from the received signal at the primary antenna 902. The primary receiver path 902 uses the acquired interference signals 906 to cancel the distortion in the received signal 910 at summation block 914 as shown in the graph 922.

Figure 11:
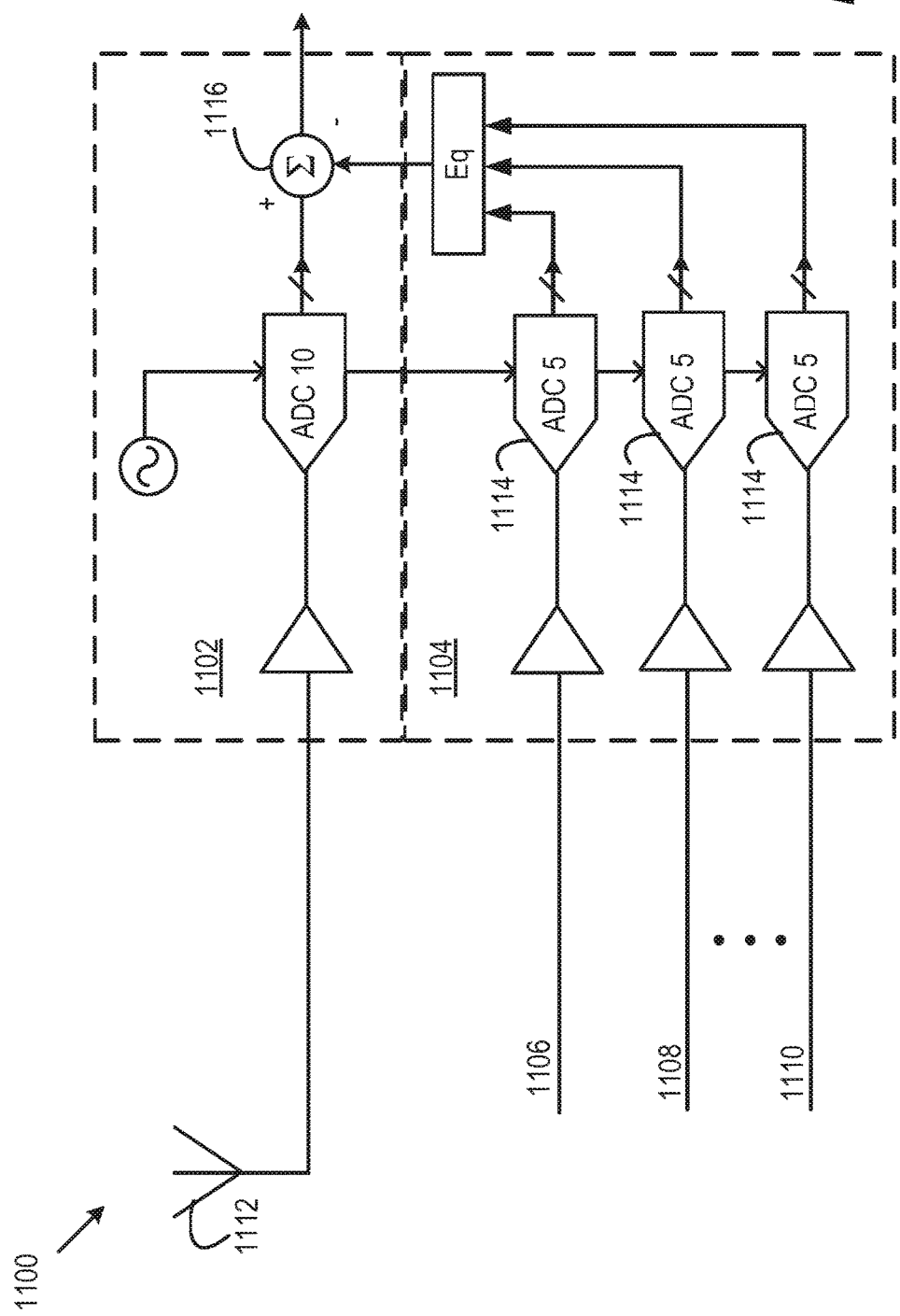
FIG. 11 is an exemplary schematic diagram of a receiver having a pick-up canceller, according to certain embodiments.

FIG. 11 is an exemplary schematic diagram of a receiver having a pick-up canceller 1100, according to certain embodiments. The receiver 1100 is one example of the RF front end 216 that can be implemented in the computing device 200. The receiver 1100 includes an antenna 1112 connected to a primary receiver path 1102 in parallel with one or more dummy lines 1106, 1108, and 1110 that have auxiliary ADCs 1114. Like the auxiliary receiver path 904 in the receiver 900 described previously, the dummy lines 1106, 1108, and 1110 detect and isolate the interference signals from the received signal which are then cancelled from the signal received by the primary receiver path 1102 at summation block 1116. In implementations where receiver components from multiple computing devices 200 are combined, the controlling computing device 200 can selects an unused receiver from a group of computing devices 200 to function as the dummy lines 1106, 1108, or 1110. SDR provides the ability to adaptively increase or decrease the number of dummy lines used by the receiver 1110.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. Additionally, an implementation may be performed on modules or hardware not identical to those described. Accordingly, other implementations are within the scope that may be claimed.

The invention claimed is:

1. A device comprising:
    circuitry configured to,
        determine operational parameters for receiver paths associated with each of a plurality of multi-input, multi-output (MIMO) antennas including a dynamic range for each of the receiver paths, wherein a first receiver path has a first dynamic range that is greater than a second dynamic range of one or more second receiver paths,
        allocate one or more unused radio components from one or more radios to the first signal path for detecting signal and blocker characteristics of the broadband spectrum environment, and
        assess the signal and blocker characteristics of the broadband spectrum environment via the first receiver path.

2. The device of claim 1, wherein the circuitry includes one or more processors associated with a software defined radio.

3. The device of claim 1, wherein the circuitry is further configured to simultaneously capture the broadband spectrum environment for a plurality of frequency bands via a broadband receiver.

4. The device of claim 1, wherein the circuitry is further configured to simultaneously capture the broadband spectrum environment for a plurality of frequency bands via one or more narrowband receivers.

5. The device of claim 1, wherein the signal and blocker characteristics include at least one of a frequency or signal strength of a desired signal or a blocker signal.

6. The device of claim 1, wherein the circuitry is further configured to detect the signal and blocker characteristics via a selected receiver path of the receiver paths having the first dynamic range.

7. The device of claim 6, wherein the circuitry is further configured to adaptively modify the selected receiver path to increase or decrease the first dynamic range based on the assessed broadband spectrum environment.

8. The device of claim 7, wherein the circuitry is further configured to modify the selected receiver path to increase the dynamic range when signal strength is less than a first predetermined threshold and blocker strength is greater than a second predetermined threshold.

9. The device of claim 7, wherein the circuitry is further configured to modify the selected receiver path to decrease the dynamic range when signal strength is greater than a first predetermined threshold and blocker strength is less than a second predetermined threshold.

10. The device of claim 1, wherein the circuitry is further configured to isolate a first blocker component from a first signal received by the first receiver path based on the signal and blocker characteristics.

11. The device of claim 10, wherein the circuitry is further configured to correlate the first blocker component with one or more additional blocker components isolated by the one or more second receiver paths.

12. The device of claim 11, wherein circuitry is further configured to remove the one or more additional blocker signals associated with the one or more other receiver paths by removing the first blocker component from the one or more second receiver paths via a blocker removal component.

13. A method comprising:
    determining operational parameters for receiver paths associated with each of a plurality of multi-input, multi-output (MIMO) antennas including a dynamic range for each of the receiver paths, wherein a first receiver path has a first dynamic range that is greater than a second dynamic range of one or more second receiver paths;
    allocating one or more unused radio components from one or more radios to the first signal path for detecting signal and blocker characteristics of the broadband spectrum environment; and assessing the signal and blocker characteristics of the broadband spectrum environment via the first receiver path.

14. The device of claim 12, wherein the circuitry is further configured to adaptively compute the blocker removal component based on the assessed broadband spectrum environment.

15. The device of claim 12, wherein the circuitry is further configured to compute the blocker removal component for each of the receiver paths based on the first blocker component isolated at the first receiver path.

16. The device of claim 12, wherein the circuitry is further configured to detect uncorrelated signal components at each of the receiver paths based on a subtraction of the blocker removal component from a corresponding received signal at each of the receiver paths.

17. The device of claim 16, wherein the circuitry is further configured to recover the uncorrelated signal components at each of the receiver paths based on an application of a computed signal recovery matrix to the uncorrelated signal components.

18. The device of claim 17, wherein the circuitry is further configured to recover the uncorrelated signal components at each of the receiver paths by applying an inverse of the computed signal recovery matrix to the uncorrelated signal components.

19. The device of claim 1, wherein the circuitry is further configured to identify a receiver path as the first receiver path based on the receiver path having the first dynamic range that is greater than the second dynamic range.

20. A software defined radio comprising:
a radiofrequency (RF) front end including hardware components with operational parameters that are configured to be adaptively modified by a radio back end; and
a processor with circuitry configured to perform one or more processes of the radio back end including:
determine operational parameters for receiver paths of the RF front end associated with each of a plurality of multi-input, multi-output (MIMO) antennas including a dynamic range for each of the receiver paths, wherein a first receiver path has a first dynamic range that is greater than a second dynamic range of one or more second receiver paths,
allocate one or more unused radio components from one or more radios to the first signal path of the RF front end for detecting signal and blocker characteristics of the broadband spectrum environment, and
assess the signal and blocker characteristics of the broadband spectrum environment via the first receiver path.

* * * * *